United States Patent [19]

Yoshimura

[11] Patent Number: 5,202,543
[45] Date of Patent: Apr. 13, 1993

[54] MANUFACTURING PROCESS OF A FUEL DELIVERY RAIL ASSEMBLY

[75] Inventor: Toshiaki Yoshimura, Numazu, Japan

[73] Assignee: Usui Kokusai Sangyo Kaisha Ltd., Shizuoka, Japan

[21] Appl. No.: 783,193

[22] Filed: Oct. 28, 1991

[30] Foreign Application Priority Data

Oct. 31, 1990 [JP] Japan .................................. 2-292103

[51] Int. Cl.[5] ...................... B23K 11/14; B23K 101/04
[52] U.S. Cl. ............................ 219/117.1; 29/890.148; 219/85.22; 219/93
[58] Field of Search .................... 219/117.1, 59.1, 67, 219/86.1, 86.24, 85.22, 93; 29/890.148; 83/54, 694, 697, 917; 228/164, 167, 170, 171

[56] References Cited

U.S. PATENT DOCUMENTS

| 123,841 | 2/1872 | Richardson | 83/697 |
| 1,860,346 | 5/1932 | Anderson | 29/890.148 |
| 2,297,013 | 9/1942 | Nichols et al. | 29/890.148 |
| 3,005,369 | 10/1961 | Koster | 83/694 |
| 3,869,776 | 3/1975 | Moshnin et al. | 29/890.148 |
| 3,924,502 | 12/1975 | Borzym | 83/54 |
| 4,667,553 | 5/1987 | Gerber et al. | 83/917 |
| 4,930,384 | 6/1990 | Nakatsuji | 83/917 |

FOREIGN PATENT DOCUMENTS

| 61-159272 | 7/1986 | Japan | 219/59.1 |
| 2-14464 | 1/1990 | Japan . | |

OTHER PUBLICATIONS

*Shielded Metal Arc Welding*, pp. 238-241, by Koellhoffer, May 1984.

*Primary Examiner*—Geoffrey S. Evans
*Attorney, Agent, or Firm*—Wenderoth, Lind & Ponack

[57] ABSTRACT

A manufacturing process of an offset-type fuel delivery rail assembly for an internal combustion engine. The offset-type assembly features offset distances between an axial centerline of an elongated conduit and those of tubular sockets for receiving fuel injectors. The process comprises the steps of clamping a conduit with a chucking tool, lowering a cutting blade onto the conduit to form arcuate edges corresponding to outside curvatures of tubular sockets, attaching the tubular sockets to the arcuate edges of the conduit by spot welding, and then brazing or welding around the arcuate edges to form an integral assembly. The cutting blade is formed into a solid circular configuration having an oblique plane. The cutting blade may be provided with a pair of longitudinal slots in order to form projections for concentrating electrical current during spot welding.

1 Claim, 3 Drawing Sheets

MANUFACTURING PROCESS OF A FUEL DELIVERY RAIL ASSEMBLY

BACKGROUND OF THE INVENTION

This invention relates to a manufacturing process of a fuel delivery rail assembly for an automotive internal combustion engine. This kind of assembly delivers fuel supplied from a pressurizing fuel pump toward intake passages or chambers via associated fuel injectors. The assembly is used to simplify installation of the fuel injectors and fuel supply passages on the engine.

There are two types of fuel delivery rail assemblies. One is a so-called top feed type and the other is a bottom flow type. The bottom flow type has several advantages including that the fuel is relatively free from vaporization since fuel passes through the center of the socket. Further, the height of installation becomes relatively small.

The process of the invention is applied to an offset-type rail assembly in which there are offset distances between an axial centerline of an elongated conduit and those of tubular sockets for receiving fuel injectors.

A typical construction of an offset-type rail assembly is disclosed in Japanese Utility Model Public Disclosure No. 14464/1990 entitled "Fuel Injection Apparatus for an Internal Combustion Engine". In this assembly, four sockets and an elongated conduit are formed into an integral unit through a casting process. These sockets and the conduit are arranged in an offset manner such that there are offset distances between the axial centerline of the conduit and those of the sockets.

These offset distances are provided so as to cause vortex flow or circulation flow within the socket in order to enhance efficiency of fuel injection into the engine cylinder.

If the offset is relatively large, arcuate edges should be formed in the conduit for receiving sockets. These arcuate edges have been made through machining work utilizing an end mill or similar tools. Then, TIG welding or Magne-TIG welding is applied to connect the sockets to the conduit.

However, there are many drawbacks in this machining work. For example, in addition to the time-consuming machining work, further time-consuming deburring work is needed to eliminate rugged burs. As a result, it takes a relatively long time to finish the arcuate edges.

SUMMARY OF THE INVENTION

It is an object of the present invention to reduce manufacturing steps of the offset-type fuel delivery rail assembly and to reduce manufacturing costs.

Another object of the present invention is to make it easy to the assembly in conformity with various specifications of engine parts.

According to the present invention, there is provided a manufacturing process of an offset-type fuel delivery rail assembly for an internal combustion engine. The assembly includes a conduit having a fuel passage therein and a plurality of tubular sockets disposed along the conduit at predetermined distances. The process comprises the steps of clamping a conduit with a chucking tool to hold the conduit in a fixed position, lowering cutting blades of a pressing machine onto the conduit to form arcuate edges corresponding to outside curvatures of tubular sockets, attaching the tubular sockets against the arcuate edges of the conduit by spot welding, and brazing or welding around the arcuate edges to provide an integral assembly.

Based upon the above process of the present invention, arcuate edges for receiving sockets are easily produced on the elongated conduit by a pressing machine. These arcuate edges are instantly made through one stroke movement of the cutting blades. No deburring process is needed after the pressing stroke. As compared with the conventional machining process, complicated edge configurations can be produced within a short time.

In addition, spot welding is effective for making provisional connections between the conduit and the sockets. Preferably, the cutting blade is formed into a solid circular configuration having an oblique plane.

Further, it is also preferable to dispose a pair of longitudinal slots upon the side of the cutting blade. These slots are used to make corresponding projections upon the arcuate edge, and these projections are used to concentrate electrical current of spot welding.

In most cases for manufacturing of the offset-type fuel delivery rail assemblies, various offset dimensions are required to conform with optional dimensions of automotive parts.

According to the manufacturing process of the invention, the offset dimension is easily changed by a setting of the pressing machine, so that it is relatively easy to adapt the assembly in conformity with various specifications of engine parts.

Embodiments of the invention will now be described by way of example with reference to the drawings.

DESCRIPTION OF THE PREFERRED EMBODIMENT

Figure 1:
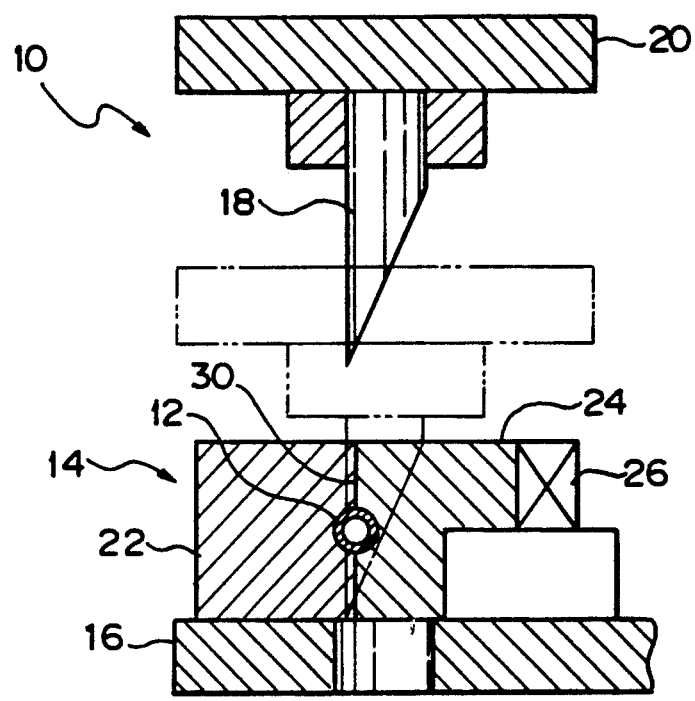
FIG. 1 is a partially broken away vertical sectional view, partly in broken, of an arch cutting apparatus for utilizing the process of the present invention.

Referring to FIGS. 1 to 5, there is shown an arch cutting apparatus 10 for carrying out the manufacturing process of the present invention.

The apparatus 10 comprises a split-type clamp mechanism 14 for holding an elongated conduit 12 carrying out sides thereof, base block 16 for supporting the clamp mechanism 14, and a holder support 20 for holding predetermined numbers of cutting blades 18. In this embodiment, three cutting blades 18 are lifted by support 20. The base block 16 and the holder support 20 are assembled into a pressing machine such that the distance between them is changed periodically according to a predetermined cycle.

The clamping mechanism 14 includes a stable chuck 22, a movable chuck 24, and an actuator unit 26 which is driven by pressurized air, hydraulic oil, or mechanical driving parts.

Figure 5:
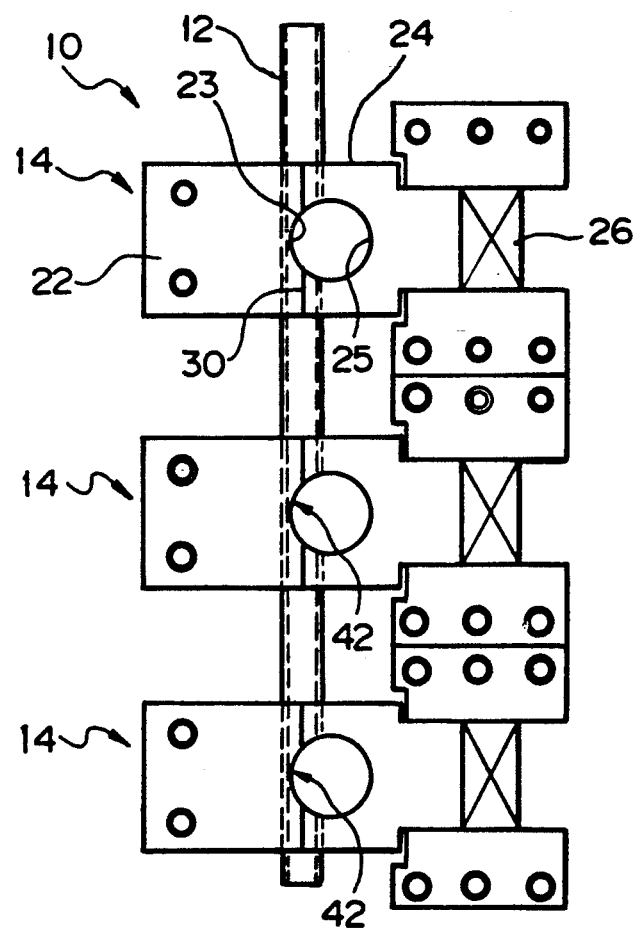
FIG. 5 is a plan view of the arch cutting apparatus.

As shown in the plan view of FIG. 5, along the abutment surfaces 30 between the stable chuck 22 and the movable chuck 24, arcuate slots 23 and 25 are provided so as to receive an outside curvature of the cutting blade 18 therein.

Figure 2:
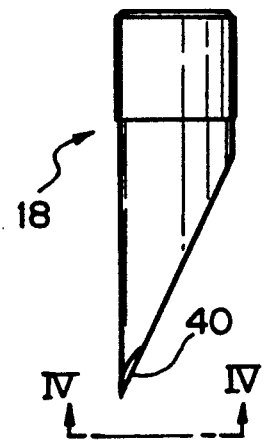
FIG. 2 is a side elevational view of a cutting blade.
Figure 3:
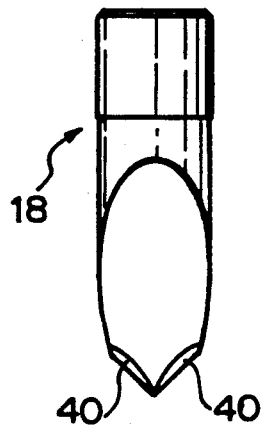
FIG. 3 is a front elevational view of the cutting blade.
Figure 4:
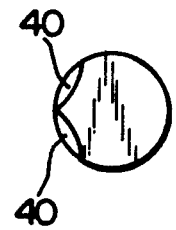
FIG. 4 is a bottom view of the cutting blade observed from the line IV—IV of FIG. 2.

FIGS. 2 to 4 show a preferred embodiment of the cutting blade 18. The basic configuration of the blade 18 is a solid circular bar having an oblique plane. Further, near the distal end of the blade 18, a pair of chamfers 40 are provided in order to reduce wear of the blade. In a conventional manner, a hardening process is applied to the chamfers 40. The blade configuration shown in FIGS. 2 to 4 is only an example. Another configuration may be used depending upon materials or size of the conduit.

Figure 7:
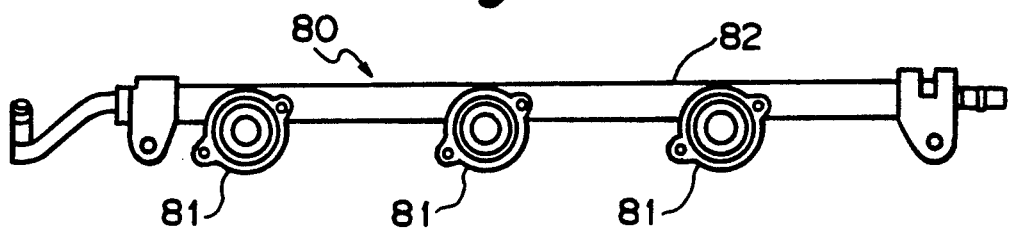
FIG. 7 is a plan view of an offset-type fuel delivery rail assembly made through the process of the invention.
Figure 8:
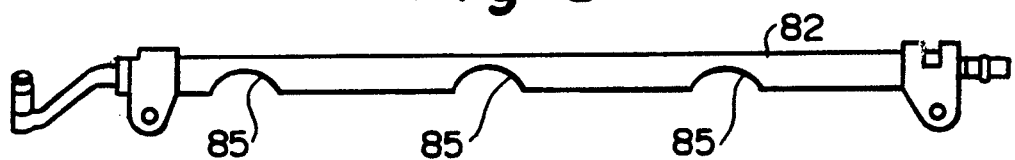
FIG. 8 is a plan view of the conduit showing arcuate edges made by the arch cutting apparatus.
Figure 9:
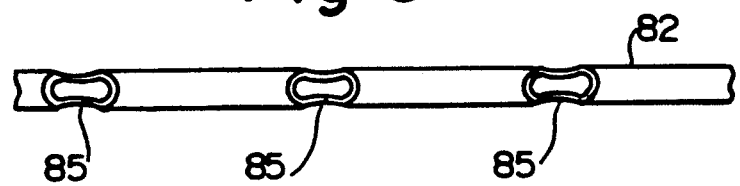
FIG. 9 is a side view of the conduit showing the arcuate edges.

FIG. 7 shows a completed offset-type fuel delivery rail assembly 80 made through the process of the present invention. FIGS. 8 and 9 show configurations of the arcuate edges 85 made by the arch cutting apparatus 10.

The arch cutting apparatus 10 functions as follows: In the initial condition, the cutting blades 18 are lifted to a top position as shown in FIG. 1. The actuator unit 26 is not yet energized, and the movable chuck 24 is held in its withdrawn position. The abutment surfaces 30 are opened for receiving a conduit 12.

First, the conduit 12 is inserted between the abutment surfaces 30 at a predetermined position. Then, the actuator unit 26 is energized to move the chuck 24, to thereby clamp the conduit 12 in a fixed position.

Then, the pressing machine begins to work, lowering the cutting blades 18 onto the conduit 12. After passing through the conduit 12, the blades 18 form arcuate edges 42 on the conduit 12. As shown in FIG. 5, three edges 42 are formed by one stroke movement of the pressing machine. The configurations of the arcuate edges 42 correspond to the outside curvatures of the tubular sockets 81 in FIG. 7. Since the cutting sections are made by the pressing machine, no deburring process is needed.

Successively, tubular sockets 81 are attached to the arcuate edges 42 and fixed thereto by spot welding as shown in FIG. 7. Then, brazing in a furnace or complete welding is applied to the assembly 80. Thus, the fuel delivery rail assembly 80 is integrally formed.

Figure 6:
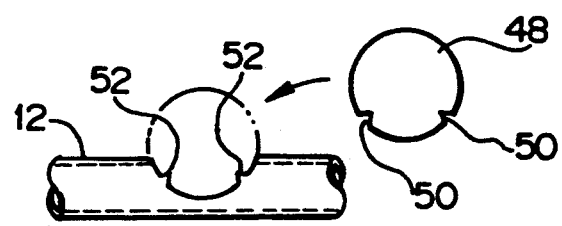
FIG. 6 is a plan view showing a modified cutting blade and a modified arcuate edge.

FIG. 6 shows a modified embodiment of the cutting blade and the arcuate edge. The cutting blade 48 is provided with a pair of longitudinal slots 50 which are used to make corresponding projections 52 upon the arcuate edge. These projections 52 are advantageous for concentrating electrical current spot welding.

I claim:

1. A manufacturing process of an offset-type fuel delivery rail assembly for an internal combustion engine, said assembly including a conduit having a fuel passage therein and a plurality of tubular sockets disposed along said conduit for receiving fuel injectors therein, comprising the steps of:

clamping a conduit with a chucking tool to hold the conduit in a fixed position;

lowering cutting blades of a pressing machine onto the conduit to form, on the conduit, arcuate edges corresponding to outside curvatures of tubular sockets and projections upon the arcuate edges;

attaching the tubular sockets to the arcuate edges of the conduit by spot welding;

brazing or welding around the arcuate edges to form an integral assembly; and wherein each of said cutting blades has the shape of a solid circular configuration having an oblique plane and a pair of longitudinal slots, said slots being used to make said projections upon the arcuate edges, said projections being used to concentrate electrical current during said spot welding.

* * * * *